235-379
E113A    OR    4,023,013    SR

United States
Kinker 4,023,013
May 10, 1977

[54] ON-LINE VERIFICATION SYSTEM FOR IDENTIFICATION CARD OR THE LIKE

[75] Inventor: Donald E. Kinker, North Canton, Ohio

[73] Assignee: Diebold, Incorporated, Canton, Ohio

[22] Filed: Dec. 29, 1975

[21] Appl. No.: 644,559

[52] U.S. Cl. .................... 235/61.7 B; 340/149 A
[51] Int. Cl.$^2$ ................ G05B 1/03; G06F 15/02; G06K 7/00
[58] Field of Search ............... 235/61.7 B, 61.7 R, 235/61.9 R, 61.11 E, 61.11 D; 250/568, 569; 340/149 A, 152, 149 R, 172.5

[56] References Cited
UNITED STATES PATENTS

| | | | |
|---|---|---|---|
| 3,611,293 | 10/1971 | Constable | 340/149 A |
| 3,648,020 | 3/1972 | Tateisi | 235/61.7 B |
| 3,846,622 | 11/1974 | Meyer | 235/61.7 B |
| 3,892,948 | 7/1975 | Constable | 340/149 R |

*Primary Examiner*—Daryl W. Cook
*Assistant Examiner*—Robert M. Kilgore
*Attorney, Agent, or Firm*—Frease & Bishop

[57] ABSTRACT

In an on-line banking system including a central computer and at least one remote terminal, a method of an apparatus for verifying that a holder of an identification card is authorized to complete a transaction at the terminal is disclosed. Account number data are machine read from the card, scrambled, and then compared to secret alphanumeric data, keyboard entered by the card holder at the terminal. The secret alphanumeric data are converted to a digital signal, and the signal is converted into first and second signal portions. The first signal portion is compared to the scrambled account number data. If the comparison is positive, the second signal portion, along with keyboard-entered transaction data and account number data, is transmitted to the central computer. Since only the second signal portion of the keyboard-entered secret data is transmitted on-line to the central computer, it is impossible to determine the entire secret data for gaining unauthorized use of the terminal by monitoring the line between the terminal and the central computer. At the central computer, the second signal portion is compared with a reference signal stored on the authorized holder's account and addressed by the account number data. In response to a positive comparison, the central computer authorizes the remote terminal to complete the requested transaction.

17 Claims, 2 Drawing Figures

ON-LINE VERIFICATION SYSTEM FOR IDENTIFICATION CARD OR THE LIKE

BACKGROUND OF THE INVENTION

1. Field of the Invention

The present invention relates generally to a method of and system for verifying that the holder of an identification card is an authorized holder of the card, and more particularly to a method of and system for verifying that a holder of the card is an authorized holder at a remote terminal in an on-line system, wherein secret data, keyboard-entered by the holder, is compared to invisible, machine-readable data contained on the card, and wherein the secret data cannot be determined by monitoring the communication line between the terminal and central computer.

2. Description of the Prior Art

Machine-readable identification cards have become prevalent in such applications as gaining access to a restricted area and performing credit sales transactions. In commercial banking, unattended, on-line banking terminals permit the performance of certin transactions. These transactions include accepting deposits, dispensing cash, transferring funds from one account to another, and making payments on credit card, utility or other accounts, or on mortagage or installment loans and the like. The customer is required to present an identification card, often formed of a plastic medium, and which contains machine-readable information. The information includes, but is not limited to, the customer's account number, the identification number of the bank or institution, and expiration date, credit limit, account balance, and types of transactions authorized. Although the information is preferably contained on the card in the form of invisible magnetically recorded indicia, the information could be contained in embossed indicia, apertures, or electrically conducting segments.

The remote banking terminal contains a keyboard, as well as a card reader. The customer places his identification card in the card reader, and his account number and other data are read from the card and converted into digital signals. Using the keyboard, the customer enters a secret number that is known to only the authorized holder of the identification card. The account number, read from the card, is transformed to another number having no logical relationship to the account number, and the transformed number is compared to the keyboard-entered, secret number. A positive comparison indicates that the customer is the authorized holder of the identification card.

The secret number is issued to the authorized holder of the identification card when the card is issued. The secret number is determined in accordance with the particular algorithn or transformation used to transform the account number.

Optionally, the keyboard-entered, secret number may be combined with an offset number, prior to comparison with the transformed account number. The offset number causes the keyboard-entered, secret number to correspond to the translated account number. This permits the customer to choose his own secret number when his card is issued.

A system for transforming a machine-read, account number for comparison with a keyboard-entered secret number, and optionally combining an offset number with the secret number prior to comparison is disclosed in U.S. patent application Ser. No. 585,401, assigned to the assignee of the present invention.

When the customer at the remote terminal is determined to be the authorized holder of the identification card presented at the terminal, the secret data along with account number and other data are transmitted to the host or central computer over a communication line. By monitoring the communication line, it is possible for an unauthorized person to "pick up" the secret data of a customer and, with possession of the identification card, effect unauthorized transactions at the terminal.

Accordingly, one objective of the present invention is to provide a highly secure method of and system for gaining entry to a remote terminal of an on-line system.

Another objective of the present invention is to provide a new and improved method of and system for determining whether a holder of an identification card is an authorized holder at a remote terminal of an on-line system.

Another objective of the present invention is to provide a highly secure method of and system for completing transactions, such as depositing or withdrawing funds, or transferring funds from one account to another, at a remote terminal of an on-line banking system.

Yet another objective of the present invention is to provide a highly secure method of and system for gaining entry to a terminal in an on-line system, wherein one portion of secret data, entered at the terminal, is verified at the terminal, and another portion is verified at the central computer.

Still another objective of the present invention is to provide a method of and system for operating a central computer from an on-line remote terminal, wherein secret data are used to gain entry to the terminal, but the secret data are not determinable by monitoring the communication line between the central computer and the terminal.

SUMMARY OF THE INVENTION

In accordance with one aspect of the present invention, in a method of and system for verifying that a customer at a remote terminal of an on-line banking system is authorized to complete a requested transation, invisible account number data prerecorded on the card, are machine read at the terminal, and converted to a digital signal. A portion of the digital signal is supplied to a signal translator, such as that described in U.S. Pat. application Ser. No. 585,401, assigned to the assignee of the present invention, to develop a translated signal having no logical relationship to the account number data signal.

Secret data are keyboard-entered at the terminal by the customer, and the data are converted to a digital signal. The digital signal is then split up into first and second signal portions. The first signal portion of the secret data is compared with the translated portion of the account data signal. If the result of that comparison is positive, the second signal portion, along with keyboard-entered transaction data and account number data is transmitted to the central computer along communication lines.

At the central computer, the second signal portion is compared with reference signal, stored in the authorized card holder's file under his account number. The file is addressed by the account number data transmitted to the computer. If the result of this comparison is positive, the customer is considered to be authorized to perform the transaction requested, and the central computer transmits a signal back to the remote terminal, enabling the requested transaction to be completed.

In accordance with another aspect of the present invention, the secret data, keyboard-entered by the customer, may be formed of alphabetic characters, numerals, or a combination thereof. Furthermore, the secret data may be formed of any number of characters or numerals, within a predetermined range, and the secret numeral may be chosen by the customer when the identification card is issued. The keyboard is an alphanumeric keyboard or, as an option, a decoder may be provided to convert alphabetic characters, entered at the keyboard, into corresponding numerals.

As another option, an offset number may be combined with the keyboard-entered, secret data, prior to comparison with the translated account number data. The offset number is recorded on the card when the card is issued. This permits the customer to choose his own secret data.

Accordingly, another objective of the present invention is to provide a new and improved method of and system for completing a transaction at a remote terminal of an on-line banking system, wherein alphabetic characters, as well as numerals, can be used as secret data keyboard-entered by the customer for verification.

Another objective of the present invention is to provide a new and improved method of and system for completing a transaction at a remote terminal of an on-line banking system, wherein any number of alphabetic characters and/or numerals can be used as keyboard-entered secret data for verification, and the secret data may be chosen by the customer when his identification card is issued.

The above and still further objectives and advantages of the present invention will become apparent upon consideration of the following detailed description of a preferred embodiment thereof, especially when taken into conjunction with the accompanying drawing.

DETAILED DESCRIPTION OF THE PREFERRED EMBODIMENT

Figure 1:
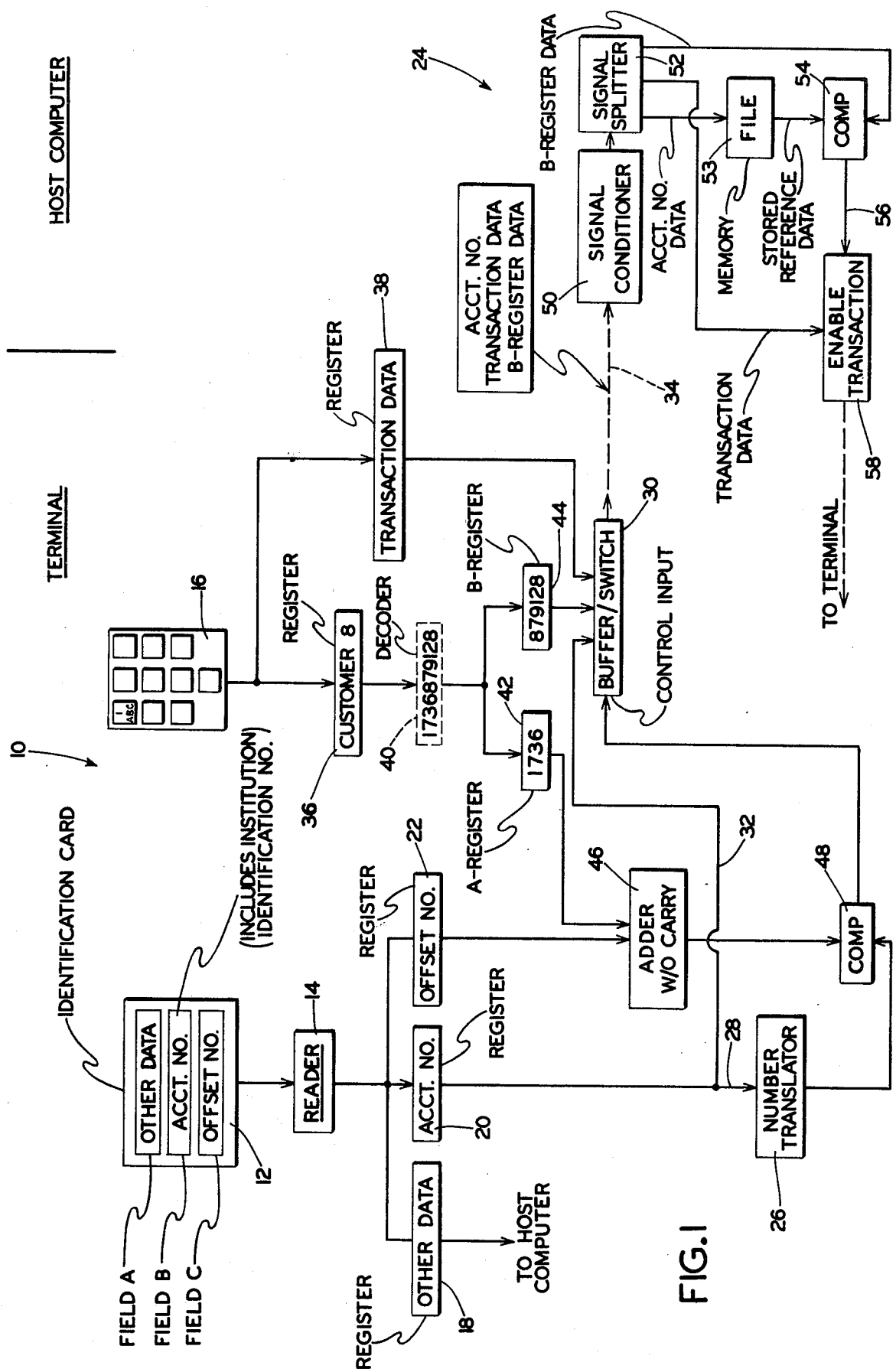
FIG. 1 is a simplified block diagram of the system, in accordance with the present invention.

Referring to FIG. 1, an apparatus 10 for verifying whether a customer presenting an identification card 12 at a remote terminal of an on-line banking system is authorized to conduct a transaction at the terminal, comprises a card reader 14 for reading data prerecorded on the card, and a keyboard 16 for receiving data manually entered by the customer. The keyboard-entered data include a secret alphanumeric code, known only to the authorized holder of the identification card, and transaction information, e.g., information relating to the type of transaction requested, and the amount thereof. The types of transactions include depositing or withdrawing funds with respect to an account, transferring funds between accounts, paying bills, and the like.

In accordance with an important aspect of the invention, two-step verification that the customer is authorized to complete a requested transaction is provided. A first portion of the keyboard-entered secret data is compared with the prerecorded data, machine-read at the terminal. Then, if the result of this comparison is positive, the remaining portion of the secret data is transmitted to the central computer for comparison with reference data recorded in the authorized card holder's file. If the result of that comparison is positive, the customer is considered to be the authorized holder of the identification card. If the particular transaction requested is an authorized one, the central computer instructs the terminal to complete the transaction. Since only a portion of the secret data is transmitted to the central computer, the entire secret data cannot be determined by monitoring the communication line.

Identification card 12 is a conventional information bearing medium, such as plastic, and contains data stored in Field A, Field B, and Field C. These data are machine-readable, but not readable to a customer. Although the data are preferably recorded on magnetizable materials, the data could alternatively be recorded via embossed encoded indicia, apertures, or electrically conducting strips.

Field A of identification card 12 contains data relating to use of the card, such as expiration date, amount, and types of transactions authorized. Field B contains the account number of the authorized holder, along with a bank or institution identification number. The account number, read from Field B, is scrambled and then compared with a portion of the keyboard-entered secret data to determine whether the customer is the authorized holder of the identification card. Field C contains an offset number determined by the bank or institution when the identification card is issued. The offset number is determined so as to cause the secret data to correspond to the authorized holder's scrambled account number, and is combined with the secret data before comparison. This permits the authorized holder of the identification card to choose his own secret data.

Reader 14 is a conventional magnetic card reader that converts the data, recorded on card 12 in Fields A, B, and C into digital signals. Reader 14 also stores the signals derived from these fields, respectively, into registers 18, 20, and 22. The A-Field signal stored in register 18, as aforementioned, relates to authorized use of the card. This signal, transmitted to the host or central computer 24, is used as a preliminary check of the validity of the card, e.g., whether the card has expired. If the central computer 24 determines that the identification card 12 is invalid, e.g., has expired, the B and C-Field data signals, respectively stored in registers 20 and 22, are not processed to determine whether the holder of the card 12 is an authorized holder, or whether he is authorized to complete a requested transaction. Preferably, keyboard 16 is enabled to receive secret data and transaction data from the customer only if the preliminary check indicates that card 12 is valid.

Assuming that the result of the preliminary check of identification card 12 is positive, the account number (the account number includes a bank or institution identification number) in register 20 is supplied to a number translator 26 along line 28. Number translator 26 converts (scrambles) that data is translated data having no logical relationship to the data stored in register 20. This is a security feature and ensures that an unauthorized holder of the card cannot use the card to complete a transaction, even if he determines the account number recorded in Field B of the card 12. Number translator 26 is a pseudo-random number generator that scrambles the account number, stored as a digital signal in register 20, in a manner dependent on the bank or institution identification number. Number translator 26 is of a type described in U.S. patent applications Ser. No. 585,401, assigned to the assignee of the present invention, and incorporated herein by reference in its entirety.

In addition to being supplied to translator 26, the account and institution number signals are also supplied, along line 32, to one input of a buffer/switch 30. As described in detail in U.S. patent application Ser. No. 585,401, as the holder of the card 12 is determined to be an authorized holders the bank or institution identification number and account number, along with transaction data and other data, are transmitted to central computer 24 over communication line 34. If the requested transaction is an authorized one, the transaction is carried out with respect to the authorized holder's account, identified by the account number, and charged with respect to the bank or institution identified by the identification number.

Keyboard 16, located at the remote terminal, is preferably an alphanumeric, push-button keyboard, wherein the push-button keys represent alphabetic characters as well as numerals. For example, the upper, left-hand push-button of keyboard 16 represents the alphabetic characters A, B, and C, as well as the numeral 1, as shown. Keyboard 16 converts the data entered therein by the holder of identification card 12 into digital signals, and stores these signals in registers 36 and 38. In accordance with an important aspect of the invention, described in detail below, the secret data entered into keyboard 16 by the customer, comprise a word, a numeral, or a combination thereof. Also, the data comprises any number of characters and numerals within a predetermined total number thereof, e.g., 4–12. These data are converted into digital signals by the keyboard 16. Signals representing the secret data are stored in register 36, and signals representing the transaction data are stored in register 38. Storage of the signals, respectively in registers 36 and 38, is controlled by central computer 24, or by a conventional sequencer (not shown) located at the terminal. Sequencing is preferably controlled at the terminal to minimize on-line time.

Preferably, the secret data stored in register 36, comprise a word, such as CUSTOMER, along with a numeral, such as 8, as shown in FIG. 1. The use of a word along with a numeral as the secret data aids the authorized holder of card 12 in remembering his secret data. For example, the authorized holder may use his own name as the word, and the year of his birth as his number.

In the preferred embodiment, the secret data are comprised of from four to twelve alphanumeric characters. Where fewer than twelve characters are used as the secret data, the numeral zero is stored in register 36 for each unused character, but the secret data are processed as a 12-character block. This is an important feature, because it permits the secret data to be variable length, determined by the authorized card holder, or by the bank or institution.

The output of register 36, containing the alphanumeric data, is supplied to an optional decoder 40 (shown in dotted lines) for converting the alphabetic characters of the secret data to numerals. Decoder 40, which is required where keyboard 16 is a type having alphabetic character keys as well as separate numeral keys, and wherein each key corresponds to a unique digital code to be generated, is conventional. For example, decoder 40 may be a read-only memory addressed by signals representing alphabetic characters and generating signals representing corresponding numerals. However, decoder 40 is omitted where keyboard 16 is an alphanumeric keyboard of the type shown in FIG. 1, wherein each key represents alphabetic characters as well as corresponding numerals. For example, in keyboard 16 (FIG. 1), the push-button key representing the letters A, B, and C also represents numeral 1. Accordingly, when the holder of card 12 enters the letter A, B, or C at keyboard 16, the digital word representing the numeral 1 is stored in register 36.

In accordance with another important aspect of the invention, the data stored in decoder 40 are split up into two data portions or segments stored respectively in A-register 42 and B-register 44. In the example of FIG. 1, the data in decoder 40 are split between numerals 6 and 8. The numerals 1, 7, 3, and 6 are stored in register 42, while the numerals 8, 7, 9, 1, 2, and 8 are stored in register 44. Optional'/, other numerals could be stored in register 42 with the remaining numerals of the secret data being stored in egister 44. For example, alternate numerals, i.e., 1, 3, ι and 9 from the example of FIG. 1 could be stored in register 42, and the remaining numerals 7, 6, 7, 1, 2, and 8 stored in register 44. As another variation, greater or fewer than four numerals could be stored in register 42 with the remaining numerals being stored in register 44. Only the numerals in register 42 are used at the remote terminal for comparison with the translated account number signal generated by number translator 26. The output of register 42 is supplied to one input of adder 46. The offset number, stored in register 22, is supplied to the other input of adder 46. These two numbers are added together without carry, and the resultant is supplied to one input of comparitor 48. The output of number translator 26 is supplied to the other input of comparitor 48.

As aforementioned, the purpose of the offset number stored in register 22, and read from Field C of the identification card 12, is to permit the authorized holder of the identification card to choose his own secret data when the card is issued. The offset number, recorded in Field C of card 12 at issuance, causes the portion of the secret data stored in register 42 to positively compare with the output of number translator 26, and is a function of the particular secret data chosen by the authorized holder of the card. This is described in detail in U.S. patent application Ser. No. 585,401. The holder of identification card 12 also enters transaction data at keyboard 16, e.g., the type of transaction requested, and the amount thereof. These data are converted to digital signals stored in register 38 under control of the sequencer (not shown). The output of register 38 is connected to one input of buffer/switch 30.

The output of B-register 44, containing the remaining portion of the secret data split out from register 40, is supplied to another input of buffer/switch 30. Buffer/switch 30 is controlled by the output of comparitor 48. A positive comparison between the output of adder 46 and the output of number translator 26 enables buffer/switch 30 to transmit the data stored in register 20, register 44, and register 38 to central computer 24 over communication line 34. Buffer/switch 30 amplifies the output of these registers for transmission of the relatively long communication line 34. Only the second portion of the secret data, stored in register 44, is transmitted to central computer 24; the first portion of the secret code, stored in register 42, is retained at the remote terminal.

At central computer 24, a signal conditioner 50 receives the data signals transmitted by buffer/switch 30 at the remote terminal and amplifies and conditions these signals for processing in the computer.

A signal splitter 52, located at central computer 24, is connected to the output of signal conditioner 50. Signal splitter 52 is a conventional signal demultiplexer circuit that detects the B-register data signal, the account number data signal, and the transaction data signal transmitted on line 34. The account number data are transmitted to computer 24 together with the B-register data, but the transaction data are preferably not transmitted until after the holder of card 12 has been determined to be the authorized holder.

The account number data signal is supplied to the input of a file memory 53 in the computer 24 as a file address. A reference data signal, associated with each authorized card holder's account, is stored in memory 53. The reference data signal, addressed in memory 52 by the account number signal, is supplied to one input of a comparitor 5. The B-register data, generated by signal splitter 52, is supplied to the other input of comparitor 54. If there is a positive comparison between the reference data stored in memory 53 (addressed by the account number data signal) and the B-register data, the comparitor 54 generates a signal on line 56 indicating that the holder of card 12 is an authorized holder. The output of comparitor 54, along with the transaction data signal generated by signal splitter 52, is connected to a switch 58. Switch 58, in turn, transmits a signal back to the remote terminal, instructing it to complete the transaction requested by the card holder.

Of particular importance, only the portion of the secret data that is stored in B-register 44 is transmitted to central computer 24 along communication line 34. The remaining portion of the secret data is retained in the remote terminal in A-register 42. It is thus impossible to determine the entire secret data by monitoring the communication line 34, since only a portion of the secret data is transmitted on the line.

Also of particular importance, is when secret data having fewer than the maximum preselected number of characters, e.g., twelve, are chosen, the numeral zero is used for the unchosen characters. The zeros, along with the chosen characters, are stored in the file memory 53 as the reference data when the file is created. The zeros stored in the file memory 53 are compared with the zeros transmitted to the central computer 24 as a secondary verification of the card. This provides flexibility in choice in secret data by the authorized card holder.

For example, in FIG. 1, assuming that the secret data were chosen as 123400000000, the data 123400000000 would be stored in register 36. Since there are no alphabetic characters in the secret data chosen, these data would be stored in decoder 40 without any modification. The data 1234 would then be stored in A-register 42 for comparison with the output of number translator 26 and numerals 00000000 would be stored in B-register 44. If the result of the comparison is positive, the zeros in register 44 would be transmitted, along with other data, to computer 24. The numerals 00000000 would then be compared with data stored in the card holder's file under his account number for the secondary verification.

Figure 2:
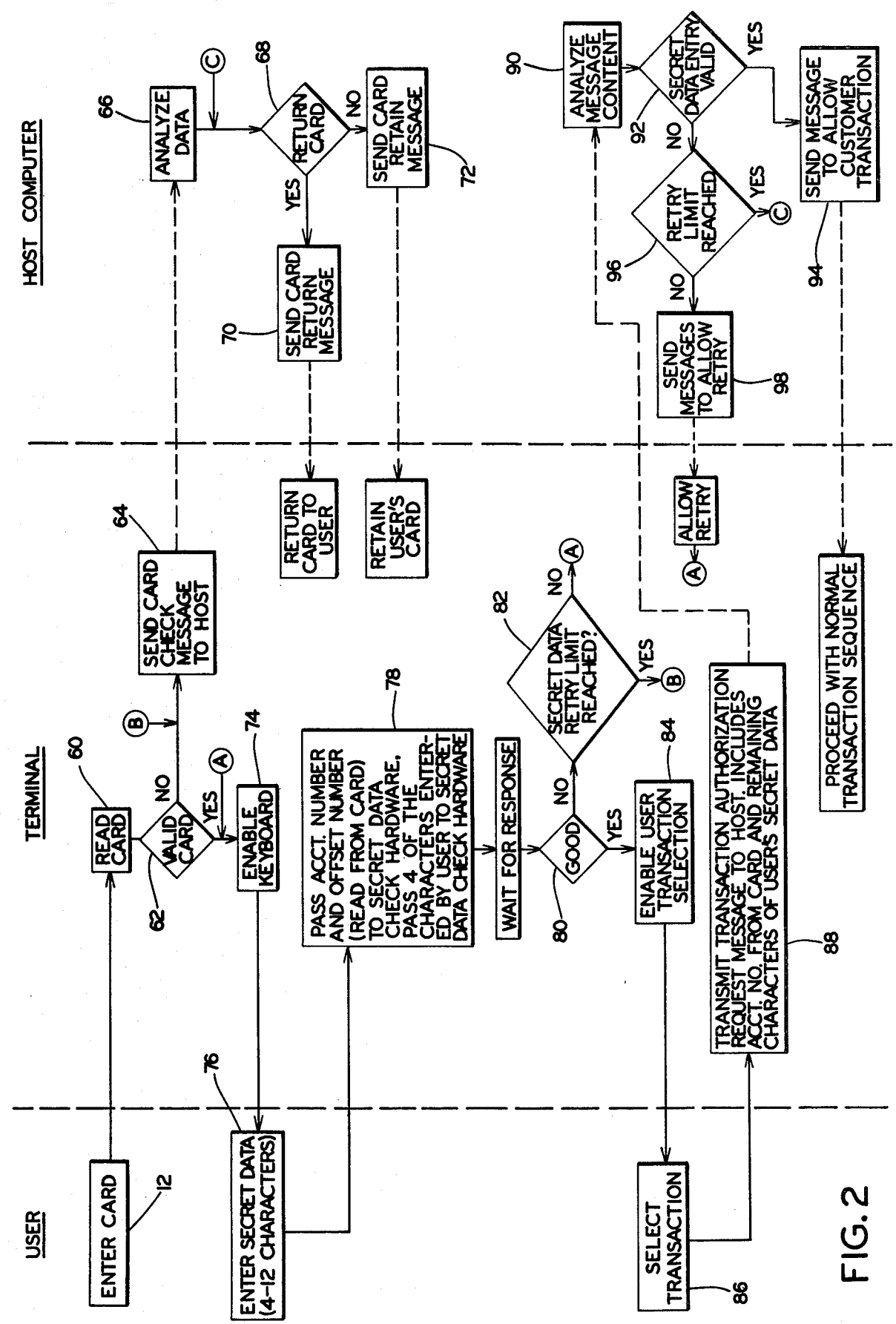
FIG. 2 is a general flow diagram illustrating the method, in accordance with the present invention.

Referring now to FIG. 2, the method of the present invention will be described. At the remote terminal, identification card 12, offered by a customer, is machine-read in step 60. By examining the data in Field A of card 12 (FIG. 1), a preliminary check of the validity of the card is made in step 62. If, in accordance with the preliminary check, card 12 is determined to be invalid, e.g., expired, a card check message is transmitted to the host or central computer in step 64. The transmitted message is analyzed at the central computer, along with the card-read data (step 66), and a decision is made whether to return the card to the holder or to retain it (step 68). If it is determined to return the card, a message to return the card to the holder is transmitted back to the terminal, in step 70. On the other hand, if it is determined to retain the card, a message to that effect, in step 72, is transmitted back to the terminal.

If the preliminary check (step 62) indicates that the card 12 is valid, the keyboard is enabled (step 74) to determine whether the holder of the card is an authorized holder. The holder then enters the secret data, via the keyboard, in step 76. The customer account number and bank or institution number, read from the card in step 60, are translated (scrambled), and one portion of the scrambled number is compared to the secret data in step 78. If the result of this comparison is negative, determined during step 80, the holder is permitted to re-enter the secret data, as in step 74. Re-entry is permitted a preselected number of times. After a last re-entry, determined during step 82, a message is transmitted to the central computer to determine whether to return the card to the user or to retain it.

If the result of the comparison in step 80 is positive, the keyboard is enabled (step 84) to receive data from the card holder. The holder selects the transaction requested, e.g., depositing or withdrawing funds, etc., (step 86). The transaction data, along with the account number data (including the bank or institution number) and only the remaining portion of the secret data, are transmitted to the central computer (step 88).

The data transmitted during step 88 are analyzed in the central computer in step 90. The analysis includes determination of whether the secret data, entered by the holder during step 76, is correct. This is done, as described in detail with respect to FIG. 1, supra, by comparing only the transmitted portion of the secret data with reference data filed in memory at the computer. The reference data are filed in the authorized holder's account file, and are addressed with the account number data transmitted during step 88. If the reference data and the transmitted secret data compare positively in step 92, a message is transmitted back to the terminal (step 94) instructing the terminal to permit the holder of the identification card to complete the requested transaction. On the other hand, if the result of the comparison in step 92 is negative, optionally, the holder may be permitted to re-enter the secret data a preselected number of times (step 96). After the preselected number of times of re-entry has been reached, a decision is made (step 68) whether or not to retain the identification card. If the preselected number of re-entries has not been reached, determined in step 96, a message is transmitted (step 98) back to the terminal to permit the holder to re-enter the secret data.

In summary, a method of and a system for determining whether the holder of an identification card at a remote terminal at an on-line banking system is an authorized holder of the card, and is authorized to complete a requested transaction at the terminal have been described. Of particular importance, only a portion of secret data, entered at the terminal by the holder, is transmitted to the central computer over the communication lines. The transmitted portion is verified at the central computer, and the remaining portion is verified at the terminal. No secret data are transmitted to the central computer unless there is a positive verification of the portion of the secret data retained at the terminal. Then, only the remaining portion of the secret data is transmitted over the communication lines. It is thus impossible to determine the entire secret data by monitoring the communication lines.

Also, of particular importance, flexibility is provided in the choice of secret data by the customer when the identification card is issued. The customer is permitted to choose secret data having any number of characters within a predetermined range of number of characters. Any combination of alphabetic characters and numerals can be chosen. This functions as a memory aid for the customer since he can choose a combination of alphabetic characters and numerals having significance to him.

While there has been described and illustrated a specific embodiment of the invention, it will be clear that variations of details of construction and of the method which are specifically illustrated and described may be made without departing from the true spirit and scope of the invention. For example, it is apparent that the principles of the present invention can be used in conjunction with any security system using an identification card and secret data memorized by the authorized card holder, e.g., gaining entry to a restricted area, point of sales credit transactions, and the like.

I claim:

1. In an on-line system including a central computer and at least one remote terminal, an apparatus for verifying that a holder of an identification card bearing machine-readable data is an authorized holder, comprising means for converting said machine-readable data into a first electrical signal; means for entering a set of indicia known by only the authorized holder; means for converting said set of indicia into first and second signal portions; first means located at the remote terminal for comparing said first signal portion with a first reference signal; means responsive to a favorable comparison in said first means for generating a first validation signal; means responsive to the first validation signal for transmitting said second signal portion to the central computer; second means located at the central computer for comparing said second signal portion with a second reference signal; and means responsive to a favorable comparison in said second means for generating a second validation signal indicating that the holder of the card is an authorized holder.

2. The apparatus of claim 1, wherein said means for entering said set of indicia includes a keyboard.

3. The apparatus of claim 2, werein said keyboard is an alphanumeric keyboard.

4. The apparatus of claim 1, including translator means for translating said first signal into a translated first signal constituting said first reference signal; said first means comparing said first signal portion with said translated first signal.

5. The apparatus of claim 4, including offset means for modifying said first signal portion to a modified first signal portion prior to comparison with said translated first signal in said first means.

6. The apparatus of claim 5, wherein said offset means includes means responsive to offset data contained on said card for modifying said first signal portion.

7. The apparatus of claim 1, wherein said second reference signal for comparison with said second signal portion is stored in a memory contained in said central computer; said apparatus further including means responsive to said first signal for addressing said second reference signal in said memory.

8. The apparatus of claim 1, wherein said set of indicia includes an alphabetic symbol, and said apparatus further includes means for decoding the alphabetic symbol to a corresponding numeral prior to translation in said translator means.

9. In an on-line system including a central computer and at least one remote terminal, an apparatus for verifying that the holder of an identification card carrying machine-readable data including an account number, is authorized to complete a transaction at the terminal, the apparatus comprising card reader means for converting said account number to a first electrical signal; input means including a keyboard for storing second and third electrical signals representing, respectively, transaction data and secret data entered by the holder, said secret data known by only an authorized card holder; means for converting said third electrical signal to a first signal portion and a second signal portion; means for translating said first signal into a translated first signal; first means located at the remote terminal for comparing said translated first signal with said first signal portion; means responsive to a favorable comparison in said first means for transmitting said first signal, said second signal portion and said second signal to the central computer; second means located at the central computer for comparing said second signal portion with a reference signal; and means responsive to a favorable comparison in said second means and to said second signal for completing a transaction in accordance with said second signal.

10. The apparatus of claim 9, including offset means for modifying said first signal portion into a modified first signal portion prior to comparison with said translated first signal in said first means.

11. The apparatus of claim 10, wherein said machine-readable data contained on said card further includes offset number data, and said offset means includes means responsive to said offset number data for generating an offset signal; and said apparatus further includes means for modifying said first signal portion in accordance with said offset signal prior to the comparison in said first means.

12. The apparatus of claim 9, wherein said keyboard is an alphanumeric keyboard, and said apparatus further includes means for converting alphabetic symbols, keyboard-entered by the holder, into corresponding numerical symbols prior to comparison of said first signal portion of said third electrical signal with said first signal in said first means.

13. In an on-line system including a central computer and at least one remote terminal having a card reader and a keyboard, a method of verifying that a holder of an identification card bearing machine-readable data is an authorized holder, comprising the steps of reading data from said card in said card reader; generating a first signal representing said card-read data; generating a second signal from said keyboard representing secret data entered therein by the holder, the secret data being known only to the authorized holder; converting said second signal into first and second signal portions; translating said first signal into a translated first signal having no logical relationship to said first signal; comparing the translated first signal to the first signal portion at the remote terminal; and, in response to a favorable comparison, transmitting the second signal portion to the central computer; comparing the second signal portion with a reference signal at the central computer; and, in response to a favorable comparison at the central computer, generating a signal indicating that the holder is an authorized holder.

14. The method of claim 13, including the step of transmitting a transaction data signal along with said second signal portion to said central computer; and performing a requested transaction in response to a favorable comparison at the central computer and in accordance with said transaction data signal.

15. The method of claim 13, wherein said step of generating said second signal includes the steps of generating a signal representative of an alphabetic character, and converting the signal representative of the alphabetic character to a signal representative of a corresponding numeral.

16. The method of claim 13, wherein said step of generating said second signal includes the steps of generating a signal representative of an alphabetic character and a signal representative of a numeral, and converting said signal representative of the character to a signal representative of a corresponding numeral.

17. The method of claim 13, including the step of addressing a memory at the central computer with said first signal to generate the reference signal corresponding to the card-read data.

* * * * *